United States Patent
Senn et al.

(10) Patent No.: US 11,584,061 B2
(45) Date of Patent: Feb. 21, 2023

(54) METHOD AND APPARATUS FOR FORMING PLASTIC PREFORMS INTO PLASTIC CONTAINERS WITH PRE-HEATING OF BLOW MOULDS

(71) Applicant: KRONES AG, Neutraubling (DE)

(72) Inventors: Konrad Senn, Alteglofsheim (DE); Thomas Hoellriegl, Teublitz (DE); Klaus Voth, Obertraubling (DE); Armin Buess, Regensburg (DE); Andreas Brunner, Aufhausen (DE); Simon Moewes, Regensburg (DE); Jochen Hirdina, Regensburg (DE)

(73) Assignee: KRONES AG

( * ) Notice: Subject to any disclaimer, the term of this patent is extended or adjusted under 35 U.S.C. 154(b) by 0 days.

(21) Appl. No.: 17/252,991

(22) PCT Filed: Jul. 24, 2019

(86) PCT No.: PCT/EP2019/069899
§ 371 (c)(1),
(2) Date: Dec. 16, 2020

(87) PCT Pub. No.: WO2020/020938
PCT Pub. Date: Jan. 30, 2020

(65) Prior Publication Data
US 2021/0245414 A1  Aug. 12, 2021

(30) Foreign Application Priority Data

Jul. 24, 2018 (DE) ..................... 10 2018 117 849.2

(51) Int. Cl.
*B29C 49/48* (2006.01)
*B29C 49/36* (2006.01)
(Continued)

(52) U.S. Cl.
CPC .......... *B29C 49/4823* (2013.01); *B29C 49/36* (2013.01); *B29C 49/786* (2013.01);
(Continued)

(58) Field of Classification Search
CPC ... B29C 49/4823; B29C 49/36; B29C 49/786; B29C 49/78; B29C 2049/4838;
(Continued)

(56) References Cited

U.S. PATENT DOCUMENTS

| 5,234,637 A | 8/1993 | Reymann et al. ........... 264/40.6 |
| 6,875,396 B1 * | 4/2005 | Limanjaya .............. B29C 49/64 |
| | | 264/528 |

(Continued)

FOREIGN PATENT DOCUMENTS

| CN | 102922733 | 2/2013 |
| CN | 103568303 | 2/2014 |

(Continued)

OTHER PUBLICATIONS

German Search Report issued in German Patent Appln. No. 10 2018 117 849.2, dated May 9, 2019, with machine English translation, 15 pages.

(Continued)

*Primary Examiner* — Alison L Hindenlang
*Assistant Examiner* — Shibin Liang
(74) *Attorney, Agent, or Firm* — Hayes Soloway P.C.

(57) ABSTRACT

Method for operating an apparatus for forming plastic preforms into plastic containers, wherein in a working mode a plurality of forming stations are moved along a predetermined transport path by a movable carrier, wherein these forming stations in each case having blow mould arrangements which in a closed state in each case form cavities, within which the plastic preforms are formed into the plastic containers and the plastic preforms are supplied to these (Continued)

forming stations in order to be formed by supplying a flowable medium to the plastic containers, wherein this forming takes place at least temporarily during the transport of the forming stations along the transport path, and wherein at least temporarily at least components of the blow moulding arrangement are tempered. At least parts of the blow mould are pre-heated in a standstill of the carrier or a movement of the carrier, which is slower with respect to a movement of the carrier in the working mode.

10 Claims, 2 Drawing Sheets

(51) Int. Cl.
 *B29C 49/78* (2006.01)
 *B29L 31/00* (2006.01)
(52) U.S. Cl.
 CPC ...... *B29C 49/78* (2013.01); *B29C 2049/4838* (2013.01); *B29L 2031/7158* (2013.01)
(58) Field of Classification Search
 CPC ... B29C 49/42; B29C 49/42408; B29C 49/48; B29C 49/12; B29C 49/66; B29C 49/46; B29C 49/10; B29L 2031/7158
 See application file for complete search history.

(56) References Cited

U.S. PATENT DOCUMENTS

| | | | |
|---|---|---|---|
| 9,266,275 B2 * | 2/2016 | Fuhrer | B29C 49/46 |
| 9,403,312 B2 | 8/2016 | Brunner et al. | B29C 49/4823 |
| 10,173,382 B2 | 1/2019 | Hoellriegl et al. | B29C 49/36 |
| 10,507,624 B2 | 12/2019 | Geltinger et al. | B29D 22/003 |
| 2007/0284789 A1 | 12/2007 | Danel et al. | 264/532 |
| 2008/0138455 A1 | 6/2008 | Hutchinson et al. | 425/72.1 |
| 2011/0236517 A1 | 9/2011 | Senn et al. | 425/145 |
| 2013/0037996 A1 | 2/2013 | Fuhrer | 264/523 |
| 2014/0021657 A1 | 1/2014 | Höllriegl et al. | B29D 22/003 |
| 2015/0145180 A1 | 5/2015 | Finger et al. | B29C 49/42 |
| 2015/0151480 A1 | 6/2015 | Brunner et al. | B29C 49/4823 |
| 2015/0306828 A1 | 10/2015 | Geltinger et al. | B29D 22/003 |
| 2017/0274576 A1 | 9/2017 | Hahn | B29C 49/48 |

FOREIGN PATENT DOCUMENTS

| | | | |
|---|---|---|---|
| CN | 104669592 | 6/2015 | |
| CN | 105034326 | 11/2015 | |
| DE | 38 32 284 | 4/1990 | B29C 33/02 |
| DE | 10 2010 003 350 | 9/2011 | B29C 49/06 |
| DE | 10 2012 212 773 | 1/2014 | B29C 49/64 |
| DE | 10 2014 105 762 | 11/2015 | B29C 49/42 |
| DE | 10 2015 116 037 | 3/2017 | B29C 49/78 |
| EP | 1 776 224 | 4/2007 | B29C 49/36 |
| EP | 2 556 944 | 2/2013 | B29C 49/48 |
| EP | 2 881 233 | 6/2015 | B29C 49/48 |
| EP | 3 047 959 | 7/2016 | B29C 49/48 |
| WO | WO 2017/050604 | 3/2017 | B29C 49/48 |

OTHER PUBLICATIONS

International Search Report (w/ English translation) and Written Opinion issed in PCT/EP2019/069899, dated Oct. 16, 2019, 14 pages.

Chinese Official Action issued in Chinese Patent Appln. No. 2019800406092, dated Jan. 26, 2021, with machine English translation, 15 pages.

* cited by examiner

METHOD AND APPARATUS FOR FORMING PLASTIC PREFORMS INTO PLASTIC CONTAINERS WITH PRE-HEATING OF BLOW MOULDS

BACKGROUND OF THE INVENTION

The present invention relates to a method and an apparatus for forming plastic preforms into plastic containers. Such methods and apparatus have been known from the prior art for a long time. In particular, it is known that heated plastic preforms are formed into plastic containers within blow moulds by applying a flowable medium.

In a conventional process, the plastic preforms are formed into the plastic containers by means of a gaseous medium and in particular compressed air. In other processes known from the more recent prior art, the heated plastic preforms are directly applied with a liquid, in particular a product to be filled later, and are thus simultaneously expanded and filled with the liquid and in particular the beverage. The present invention is suitable both for methods in which this forming takes place by means of a gaseous medium, i.e. in particular by means of compressed air, and for methods in which the forming takes place by means of a liquid medium and in particular by means of the beverage to be filled.

Such forming devices usually have a movable, e.g. rotatable carrier on which the forming stations are arranged, wherein during a working process, the plastic preforms are formed into the plastic containers during their transport with this carrier or the forming stations. In some methods it is necessary to temper the respective blow moulds of the forming stations and especially those wall areas which come into contact with the plastic preforms to be expanded.

It is known that the blow moulds are tempered by means of electrical energy, for example by heating, as well as by means of a tempering medium, for example a heated oil. Since the forming stations of many machines are located on a rotating carousel, it is known in the prior art to couple supply lines, for example for electricity but also for liquid, from a stationary area to a rotating area. Such a machine is for example known from the EP 1 776 224 B1. This device describes a carousel-like rotating machine, which has a rotating fluid connection and a rotating power connection on a rotating column, which are connected to a fixed power supply or fluid supply.

When electrical heating means are used in a forming unit or other apparatus for manufacturing containers from a thermoplastic material, a high level of energy is used in particular for pre-tempering, for example heating, of the blow moulds. This is due to the fact that the greatest temperature difference must be overcome during this time period in order to bring the blow mould from an initial temperature to an operating temperature.

Once the blow mould has been brought to a certain target temperature, the blow mould only needs to be kept at this temperature and the temperature differences to be overcome are lower. Accordingly, it is particularly necessary to supply more energy to a machine at the start of commissioning in order to achieve a high heating performance and to reach an operating temperature as quickly as possible.

In the prior art, the blow moulds of all forming stations of the apparatus for forming plastic preforms into plastic containers are usually heated with the same heating elements in all steps. This ensures that heating is only possible with a limited heating performance at the beginning. In addition, the use of electric heating elements requires the most energy at the start, since thereby the greatest temperature differences must be overcome.

Accordingly, in the prior art, it takes a relatively long time to get the blow moulds up to an operating temperature. Valuable working time for preparing the machine is also lost here. In addition, relatively high performances must also be coupled from the stationary area to the rotating area, since a relatively high output is required if all heating elements are to bring the blow moulds to an operating temperature, in particular simultaneously.

SUMMARY OF THE INVENTION

Therefore, the present invention has the object of shortening the time required to commission such an apparatus. Furthermore, such an apparatus should work in a more energy balanced way than is the case in the prior art. This is intended to ensure that such an apparatus can be put into operation more quickly. It is also advantageous to design the machine smaller than is usual in the prior art and in particular energy transmission equipment should be designed smaller.

In a method according to the invention for operating an apparatus for forming plastic preforms into plastic containers, a plurality of forming stations are moved along a predetermined transport path in a working mode by means of a movable carrier, wherein these forming stations having blow mould arrangements in each case, which, in a closed state, form cavities in each case within which the plastic preforms are formed into the plastic containers and wherein the plastic preforms are fed to these forming stations in order to be formed into the plastic containers by supplying a flowable medium. This forming takes place at least temporarily during the transport of the forming stations along the transport path and at least temporarily at least components of the blow mould arrangement are tempered.

According to the invention, at least parts of the blow moulds are pre-heated in a stillstand of the carrier or in a movement of the carrier which is slower with respect to a movement of the carrier in working mode.

It is therefore proposed, according to the invention, that the energy-intensive pre-tempering of the blow moulds should not take place while the machine is running, but in particular when the carrier, for example a blow wheel, is stationary. The working mode of the apparatus is understood to be, in particular, a production mode, i.e. a mode in which plastic containers are produced, in particular blown.

Therefore, the invention proposes an apparatus and a method which serve to reduce the time required for the blow moulds to reach the operating temperature and also to provide the energy or power required for this purpose. This is achieved, as mentioned above, in particular by connecting a connecting line, as explained in more detail below, to a stationary (or possibly only slowly rotating) container manufacturing machine, preferably a fixed connecting line or feed line which provides the necessary energy and/or power to bring the blow moulds more quickly to an operating temperature, so that the overall time for commissioning the apparatus is reduced.

Besides or in addition to this, it would also be possible to feed additional heating means to the machine to accelerate a preheating.

In particular, the temperature control is a heating up of the blow moulds. In this way, blow moulds heated during working mode, for example to temperatures of 40 or 60 or more degrees Celsius, are made available, which are desired for certain forming processes.

It would be possible to heat the blow moulds directly and in particular those areas that will later come into contact with the plastic preforms. However, it would also be possible to heat any carrier shells or carriers of the blow moulds, wherein the blow moulds themselves would also be heated by convection. In this case the blow moulds are at least indirectly heated.

Preferably, the blow moulds have at least two side parts and, particularly preferably, additionally a bottom part, which together form the cavity within which the plastic preforms are expanded to form the plastic containers and, in particular, plastic bottles. It is possible for one of these side parts to be pivotable relative to the other side part for opening or closing the blow mould.

In another advantageous method, the bottom part in question is also tempered at least temporarily. The bottom part of the blow mould is also preferably pre-tempered during a standstill of the carrier.

In a further preferred method, the plastic preforms are also expanded during working mode by means of a rod-like body that is inserted into them.

The blow moulds are opened or closed by pivoting at least one blow mould part relative to a second blow mould part with respect to a vertical axis and/or an axis parallel to the plastic preform to be expanded.

In another preferred method, the plastic preforms are expanded during their movement.

Particularly preferred, the temperature control is carried by supplying energy, for example by supplying a temperature control medium and/or by supplying electrical energy.

Pre-heating is particularly preferred a heating and in particular a heating of the blow moulds to or almost to the operating temperature. It would also be possible to heat the blow moulds (slightly) above an operating temperature in order to take account of the fact that during the period in which the energy supply is disconnected before pre-tempering, a certain cooling of the blow moulds occurs again.

In a further preferred method, a further tempering of the blow moulds is carried out at least temporarily during the working mode. In particular, it is possible that after the operating temperature has been reached by the pre-temperature control, these is maintained by reheating.

Preferably, a temperature of the blow moulds is also recorded at least temporarily. A control circuit can be provided for this purpose, which also effects a temperature control of the blow moulds depending on a determined temperature of the respective blow moulds.

In a further preferred method, pre-tempering is carried out at least temporarily at a higher performance than the further tempering. This means that pre-tempering is performed at a higher performance until the blow moulds have reached a certain operating temperature. Afterwards, an attempt is merely made to maintain this temperature during operation.

In the case of temperature control and in particular heating with electrical energy, a higher electrical energy can be supplied during pre-tempering than during working mode. In the case of temperature control with a liquid temperature control medium, the temperature control medium can be supplied with a higher temperature, a higher flow velocity, a larger flow cross-section and/or a higher pressure during the pre-tempering control phase.

In a further preferred method at least temporarily during a standstill at least one supply line for supplying energy for the pre-tempering is connected. As mentioned above, this can be an electrical line, but also a liquid line. It would also be possible to connect both an electrical line and a liquid line. After this pre-tempering, the lines are disconnected as explained in more detail below and the machine can be started up and, in particular, the movable and preferably rotatable carrier can start rotating. From this point on only the operating temperature has to be maintained for the individual forming stations or their blow moulds.

Furthermore, it is possible to connect the said feed lines automatically or manually. A robot can also be used to perform such a coupling.

Automatic couplings are preferably used for this purpose. Such automatic couplings are known from certain areas of technology, for example in rail transport. Preferably, such couplings can be produced and released automatically. This can be a coupling for an electric power line as well as a coupling for a fluid line.

In a preferred method, the pre-tempering and/or the further tempering is carried out by electrical heating elements. Electrical resistance elements are particularly preferably used for this purpose and/or are fed in to bring the blow moulds to an operating temperature more quickly. It is possible that such heating elements are fed specially for the pre-tempering process. However, it is also possible that these heating elements are permanently present and are only supplied with current for pre-tempering the blow moulds. In a further configuration, tempering media are fed into one or more fluid lines of the apparatus. These fluid lines preferably contain a tempered fluid, especially a heated fluid.

In a further embodiment, only one or more supply lines, in particular one or more power lines, are connected, so that the existing heating elements have the necessary energy available, so that the operating temperature can be reached more quickly. Afterwards the lines are preferably disconnected again and the heating elements only have to maintain the temperature.

As mentioned above, the coupling, in particular of the supply lines, particularly preferably of an electric power supply line, can be carried out either automatically by certain means, such as pneumatic or hydraulic cylinders, spring elements or the like, or by manual action of the operator.

After the blow moulds have been brought to a temperature in the range of the operating temperature, the additional elements are automatically or manually decoupled again. The remaining heating elements then only have to maintain the temperature.

Another way to reach the operating temperature faster would be to use a neck cooling system as an additional temperature control medium. It would be conceivable to increase the temperature of the cooling medium for the heating process so that it acts as an additional heating means. To start production, the temperature of the cooling medium is brought back to the operating temperature actually intended for this purpose.

As mentioned above, this process of pre-tempering or heating can take place in particular when the machine is stationary or rotating relatively slowly. For example, it is known from the applicant's internal prior art that neck cooling for the containers is supplied via a rotary union. In this way, the temperature of the moulds can be controlled both when the carousel is stationary and when it is rotating.

It would be conceivable, for example, to connect a rotary union to an integrated temperature control unit (ITG). In this case it is possible to set the flow temperature variably, for example between temperatures of 10° C. (cooling during operation) and 95° C. (in particular for heating during preheating).

It would also be possible that such an arrangement with electric heating elements could reduce the connecting cable required in a rotating carousel. In operating mode, the heating elements (heating rods etc.) could regulate the temperature by alternately switching themselves on and off for a certain period of time.

In a preferred method, therefore, blow moulds of different forming stations are at least partially tempered with a time offset to each other in a working mode. For example, it is possible that at certain periods of time a first half of the blow moulds is tempered and at a further time or period of time the other half of the blow moulds is tempered. It would also be possible, for example, for the blow moulds to be tempered in turn or alternately according to a different principle. It would also be possible that during a first period of time the blow mould assemblies of a first group of forming stations are tempered and in a second period of time the blow mould assemblies of a second group of forming stations are tempered.

This temperature control and also the pre-tempering can be controlled via a control unit. If only a few heating elements heat at a time, the required power is lower and the temperature can be kept at a certain value.

It would also be possible to use a robot, in particular a robot with a gripper arm, to connect and disconnect the elements or supply lines. This could be done, for example, by means of a changing robot, which, in addition to this task of coupling and uncoupling, particularly preferably also perform the task of changing blow moulds or other tasks such as changing stretching rods and the like.

Particularly preferably, at least one parameter is measured that is relevant for the heating process. In particular, but not exclusively, an actual temperature of the blow moulds is measured. In addition, a value characteristic of a heating power, such as a flowing current and/or an applied voltage, can also be measured.

In addition, other physical parameters can also be measured, such as an ambient temperature, a pressure of a tempering medium or similar.

Preferably, the apparatus is able to detect a state of the machine with the help of certain sensors or measuring devices and to react based on certain signals, such as the measurement of a temperature, an operating state or the like, and preferably also to carry out corresponding adjustments such as in particular but not exclusively the coupling of a power supply or the supply of additional heating elements. If a corresponding signal is given or a certain value or condition is detected, the coupled supply lines or heating elements are decoupled again, preferably automatically.

A certain actual value, such as an actual temperature, is compared with a nominal temperature, at least during working mode, and a temperature of at least one forming station is readjusted, in particular by means of a control circuit. It is particularly preferred that the individual forming stations are heated separately and/or independently of each other.

In a further preferred method, additional supply lines are first fed, in particular at a standstill of the apparatus and in particular the carrier. This can be a central supply line, which is distributed on the machine to the individual forming stations. It would also be possible to feed separate supply lines to each of the individual forming stations.

In a further method step, the blow moulds are pretempered or preheated for a predetermined period of time. In a further method step, the aforementioned feed lines are disconnected. In a further method step, the machine is put into operation. In particular, a movement of the carrier and in particular a rotary movement is started.

The present invention is further directed towards an apparatus for forming plastic preforms into plastic containers and in particular plastic bottles. This apparatus comprises a movable and in particular rotatable carrier on which a plurality of forming stations is arranged, wherein each of these forming stations comprising a blow mould arrangement which is suitable and intended for forming the plastic preforms into the plastic containers, and wherein this blow mould arrangement being arrangeable or moveable in an opened and a closed state and, in the closed state, forms a cavity within which the plastic preforms can be expanded into a plastic container by being acted upon by a flowable medium, and wherein the forming stations in each case have tempering devices for at least temporarily tempering at least a section of the blow mould arrangement.

According to the invention, the apparatus has connection means for attaching feed lines in a stationary or slowly rotating or moving state of the carrier in order to supply the temperature control device with energy, wherein thereby in particular a pre-tempering of the blow mould arrangements is carried out.

In particular, temperature control units for pre-tempering the blow mould assemblies are supplied with electrical energy or directly with thermal energy, for example from a liquid.

The apparatus described here is particularly preferably suitable and intended to carry out the method described above. It should be noted that all features mentioned in this description on the apparatus side are also applicable in the method also described. Conversely, all method steps carried out with certain equipment are also designed in such a way that the corresponding apparatus has the appropriate equipment.

Preferably, the connection means are electrical connection means or fluid connection means. This means that the connecting means are capable of supplying the blow mould assembly with power or with a flowable temperature control medium, such as hot oil or hot water.

The apparatus has particularly preferably a plurality of such connection means. This makes it possible to assign appropriate connection means to each individual forming station. However, it is also possible that the apparatus has a distribution device which distributes, for example, electrical energy or a fluid to several forming stations. This distribution device could be supplied centrally, in particular during a standstill of the carrier.

In a further advantageous embodiment, the apparatus has a changing device which is suitable and intended for semi-automatic or automatic removal or installation of the appropriate connecting means. In particular, a changing robot could be provided for this purpose.

In a further advantageous embodiment, the apparatus has a supply device for temperature control of at least one section of the blow mould arrangement even in a working mode. Thus, for example, in addition to the connection means that can be mounted in stationary or slow operation, a distributor can be provided which also allows the temperature control of the blow mould arrangements during operation.

It would thus be possible for the apparatus to have a slip ring arrangement which enables an electrical supply of the individual forming stations or their blow mould arrangements during operation. In addition, there could also be a liquid distributor which, during operation, supplies the individual forming stations or, in particular, their blow mould arrangements with a flowable temperature control means and, in particular, a liquid temperature control means.

In a further advantageous embodiment, the supply device has a control device to supply the individual forming stations or their blow mould arrangements with energy and in particular electrical energy at least partially with a time delay. Thus, for example, the supply to the individual forming stations could be time-controlled and special care could be taken to ensure that the individual forming stations are tempered at different times. In particular, this supply device serves to keep the individual forming stations or their blow mould arrangements at an operating temperature which has been reached by the pre-tempering process.

In a further advantageous embodiment, the forming devices in each case have electrically operated heating elements for heating the blow mould arrangements and, particularly preferred, switching devices for controlling these heating elements. These control devices can preferably be relays and in particular semiconductor relays. Preferably the heating elements are heating cartridges. These can be permanently provided in the blow mould arrangements or the forming stations, but it would also be possible for individual heating elements to be fed specifically for the pre-tempering process.

In a preferred embodiment, the apparatus has a rotary distributor and in particular a rotary electrical distributor which supplies the individual semiconductor relays.

In a further preferred embodiment, the apparatus has a temperature measuring device which measures at least one temperature of individual forming stations and in particular their blow mould arrangements. This can be a temperature measuring device which detects the temperature without contact, such as, in particular but not exclusively, a pyrometer. In a further advantageous embodiment, the apparatus has a control circuit which is suitable and intended to control the individual forming stations and/or supply them with electrical energy.

The use of semiconductor relays has the advantage that they require less space than heating controllers that are otherwise provided in the prior art.

The electrical heating elements can be controlled very well and precisely via the semiconductor relays. As the full power of all heating elements is not necessary to maintain the temperature, they can be switched on and off alternately for a certain time. As a result, not all heating elements consume electricity at the same time, and the total connected load required is therefore lower.

By adding additional supply lines, in particular power supply lines or further heating elements, the blow mould assemblies are brought to the required operating temperature more quickly and the apparatus can start production more quickly.

This results in a higher production rate and consequently a higher economic profit. Automatic coupling, for example by means of a pneumatic or hydraulic cylinder, could also reduce the coupling time, as it would not require a manual step.

Automatic coupling would also allow better control and reduce the risk of incorrect operation and consequent damage. A further advantage of such an apparatus is that smaller components are needed inside the machine. Furthermore, when using electric heating elements to maintain the temperature of the blow-moulding arrangements, the slip ring can be made smaller, saving space and costs as the supply lines could be smaller.

If the temperature were to be maintained with a flowable medium, the rotary distributor required for this purpose could also be made smaller, as the supply lines could be smaller. This would also save space and costs.

The slip ring (or the rotary distributor for the tempering medium) could be made even smaller by the special control of the individual heating elements. To maintain the temperature the heating elements could be switched on and off for a certain time. Thus not all heating elements would be in operation and the required connected load would be lower.

It would also be possible to pre-heat the blow mould via electrical connection means and to control the temperature during operation, for example, via a fluid means supply. Conversely, it would also be possible for the blow moulds to be pre-tempered via a fluid means supply and for the operating temperature to be maintained during operation via electrical auxiliary heating media. In addition, both temperature control processes could also be carried out with electrical energy or also with a temperature control medium.

BRIEF DESCRIPTION OF THE DRAWINGS

Further advantages and embodiments are shown in the attached drawings.

In the drawings.

DETAILED DESCRIPTION OF THE INVENTION

Figure 1:
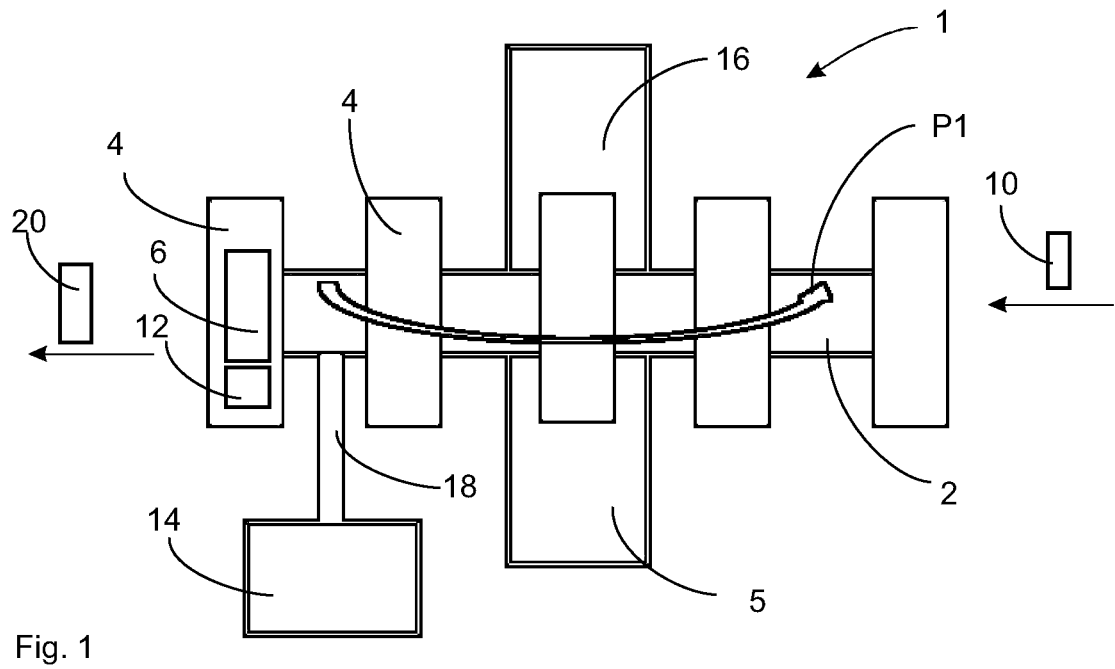
FIG. 1 shows an apparatus according to the invention in a first embodiment.

FIG. 1 shows an apparatus 1 in according to the invention for forming plastic preforms 10 into plastic containers and in particular plastic bottles 20. As shown by the right arrow, plastic preforms 10 are fed to the apparatus and these are formed into the plastic containers 20 by application with a flowable medium, which are then discharged from the machine.

For this purpose, the apparatus has a rotatable carrier 2 on which a plurality of forming stations 4 are arranged, which move with it along circular transport path along the arrow P. The individual forming devices or forming stations 4 in each case have (only one shown) blow mould arrangements 6, as well as temperature control devices 12.

The reference sign 16 identifies a drive shaft for driving the carrier 2. The reference sign 5 identifies a rotary distributor with the aid of which electrical energy or a tempering medium can be distributed to the individual forming stations. This rotary distributor can, for example, distribute a tempering medium to the stations or also electrical energy (in this case the rotary distributor can be a slip ring in particular).

The reference sign 14 identifies a heating unit which is connected to the apparatus in a particularly stationary state of the carrier. As shown here, this can be an electrical unit which is connected to the individual forming stations via a connecting line 18. For this purpose the blowing wheel or carrier 2 can have a central power supply which in turn distributes the currents for pre-tempering or pre-heating the blowing mould arrangements 6 to the individual forming stations.

Figure 2:
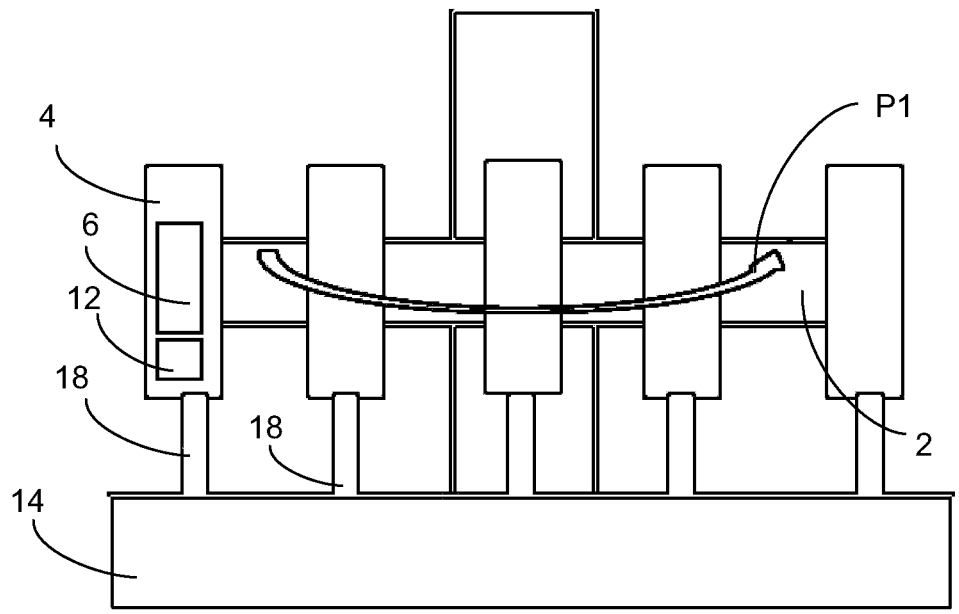
FIG. 2 shows an apparatus according to the invention in a second embodiment.

FIG. 2 shows a further embodiment of the present invention. The essential difference here is that not only one feed line 18 is provided, but a plurality of feed lines, which connect a power supply unit with the individual forming stations. In this way, the individual forming stations or blow mould arrangements are heated separately.

Figure 3:
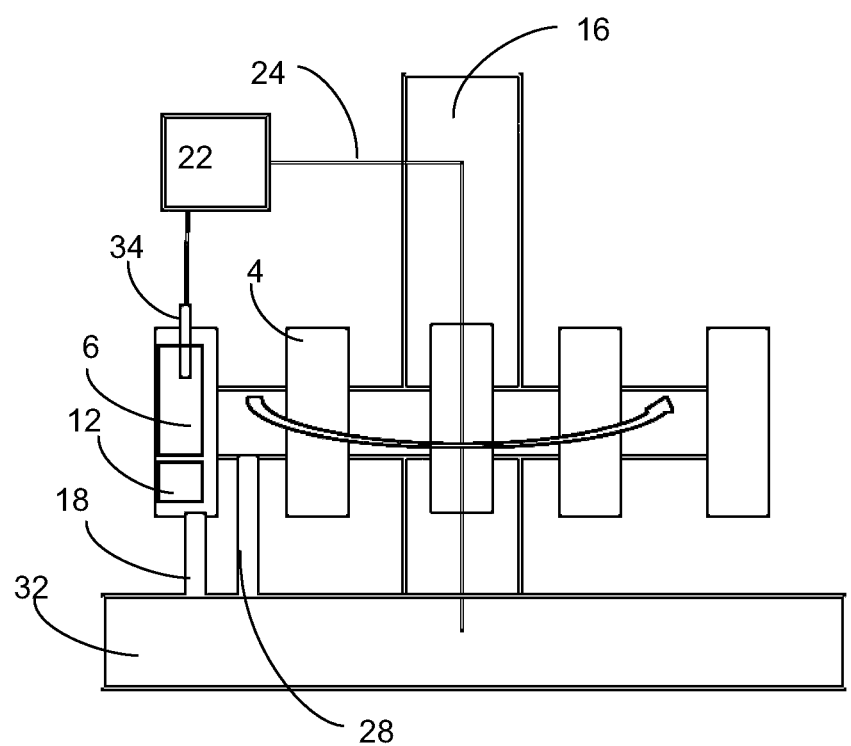
FIG. 3 shows an apparatus according to the invention in a third embodiment.

FIG. 3 shows a further embodiment of the present invention. Here again a supply line 18 is provided, which can supply the forming stations with electrical energy during operation. In addition or alternatively, a central supply line 28 can also be provided, which in turn centrally supplies the forming device, for example, with a flowable medium or with electrical energy. In addition, the apparatus here has a power supply line 24, which maintains the temperature of the individual blow mould arrangements 6 during operation. For this purpose, a semiconductor relay 22, which is only shown here schematically, is provided, which can optionally control the individual forming stations or heating elements (or in this case a forming station) of the forming stations. In this way, as mentioned above, the energy requirement for heating the individual blow mould arrangements can be reduced.

It is possible that this heating element 34 is permanently located at the forming station 4, but it is also conceivable that the heating element is fed to the forming station specifically for the temperature control process. The temperature control device 12 can also be fed for the pretempering process or it can also be permanently arranged at the forming station and/or blow mould arrangement and/or carrier shell.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 apparatus
2 rotating carrier
4 forming stations
5 rotary distributor
6 blow mould arrangements
10 plastic preforms
12 temperature control devices
14 heating unit
16 drive shaft
18 connecting line
20 plastic bottles
22 semiconductor relay
24 energy supply line
28 central supply line
34 heating elements
P arrow

The invention claimed is:

1. A method for operating an apparatus for forming plastic preforms into plastic containers, wherein in a working mode a plurality of forming stations are moved along a transport path by a movable carrier, wherein these forming stations in each case having blow mould arrangements which, in a closed state, in each case form cavities within which the plastic preforms are formed into the plastic containers and the plastic preforms are fed to these forming stations, in order to be formed by supplying a flowable medium to the plastic containers, wherein this forming takes place at least temporarily during the moving of the forming stations along the transport path, and wherein at least temporarily at least components of the blow mould arrangement being tempered, wherein at least parts of the blow mould arrangement are preheated in a standstill of the carrier or a movement of the carrier which is slower with respect to a movement of the carrier in the working mode, and wherein at least temporarily during the working mode a further temperature control of the blow mould arrangements is carried out.

2. The method according to claim 1, wherein a pre-tempering is carried out at least temporarily with a higher heating power than a further tempering.

3. The method according to claim 2, wherein at least temporarily during the standstill at least one connecting line is connected for supplying energy for a pre-tempering.

4. The method according to claim 3, wherein the connecting line is an electrical line or a fluid line.

5. The method according to claim 2, wherein a pre-tempering and/or further tempering is carried out by electrical heating elements.

6. The method according to claim 2, wherein during the working mode, blow mould arrangements of different forming stations are at least partially temperature-controlled with a time delay.

7. The method according to claim 1, wherein
at least temporarily during the standstill at least one connecting line is connected for supplying energy for a pre-tempering.

8. The method according to claim 7,
wherein
the connecting line is an electrical line or a fluid line.

9. The method according to claim 1, wherein
a pre-tempering and/or further tempering is carried out by electrical heating elements.

10. The method according to claim 1, wherein
during the working mode, blow mould arrangements of different forming stations are at least partially temperature-controlled with a time delay.

* * * * *